United States Patent Office 2,987,403
Patented June 6, 1961

2,987,403
METHOD AND PACKAGE FOR PROTECTING FOOD FROM MOLD AND OXIDATION
June Clarence Tupper, 31 Eastman St., Plymouth, Wis.
No Drawing. Filed Apr. 30, 1959, Ser. No. 809,905
16 Claims. (Cl. 99—178)

This invention relates to a method and package for protecting food from mold and oxidation.

The specific purpose of the invention is to prevent the molding of cheese in consumer size packages. However, the invention is generic in that it is also applicable to other foods having mold or oxidation problems. Meat and coffee are examples. Coffee may not be a food in a strict sense, but it may be so regarded for the purposes hereof, being intended for human consumption. Since my primary interest is in cheese, the invention will be described with particular reference to protecting cheese from molding, where it has advantages of great importance, but it will be understood that this is also by way of exemplification of the generic invention.

Throughout the cheese industry there has been continuous effort for a period of years to provide packaging procedures which would prevent the molding of cheese, and sliced cheese in particular. It is known that molds which grow on cheese require oxygen for growth. Hence, expensive and complicated apparatus and procedures have been developed for evacuating oxygen from the cheese and from the package in which the cheese is wrapped. It does not suffice merely to withdraw the oxygen from the wrapper, since the food may have oxygen dissolved therein. This is invariably true of cheese. Hence, in order to protect against mold development, it is necessary to withdraw the oxygen from the food itself as well as from the wrapper. There are numerous patents already granted which disclose processes in which oxygen is withdrawn by the evacuation of air from the package of cheese, meat or coffee, and in many instances the oxygen withdrawn from the package is replaced with an inert gas such as carbon dioxide.

The present invention is much less expensive and much more effective in protecting the product. It involves simply the incorporation in the package of any appropriate aerobic organisms such as bacteria or yeasts. Yeasts themselves are highly aerobic, as are the bacteria incidentally found therein. Brewers yeast, therefore, is a desirable inoculant not only in itself, but because of the aerobic bacteria normally found in commercial brewers yeast. The organisms consume the available oxygen, and any additional oxygen released from the product, and then their growth ceases. Meantime, in the oxygen-free package, mold cannot grow and the oxidation of the product cannot occur.

The character of the container or wrap is immaterial as long as it is substantially impervious. In the case of coffee, the container may comprise either an impervious bag or the usual sealed metal can or jar. In the case of meat or cheese, any of the conventional wrapping materials such as saran, polyethylene, saran-coated cellophane, or cellophane coated with synthetic rubber and amorphus wax may be used. It is not absolutely necessary that the wrapper be completely impervious as long as it does not admit oxygen more rapidly than it can be consumed by the aerobic organism content of the package. However, it is preferred that the material be as nearly impervious as is reasonably possible.

It is not desired to limit the invention to the use of any particular aerobic organism for the reason that any aerobic organism will suffice if it is capable of consuming the oxygen from a food package which has been substantially sealed. As between the various available aerobic, aerobactic aerogenes, or Eschericia coli, or Nitrobacteriaceae (nitrogen fixing bacteria) organisms, the choice will be made according to considerations which have no direct bearing on my objectives but may have great incidental importance. For example, the organisms I prefer to use when in direct contact with the food are those found in ordinary brewers yeast, namely Saccharomyces cerevisiae. Torula yeast is also usable. These are the only organisms thus far known to me which not only consume the oxygen, but accomplish this result without raising any health problem or any flavor problem. The acetic bacteria used in making vinegar obviously present no health problem and so far as present experimentation shows, they do not change the flavor of the cheese to a perceptible degree and hence are usable for all purposes. The reason why flavor changes are not regarded as significant to the generic aspects of the invention is that, in the case of a food, many persons may prefer the changed flavor over the original flavor.

Provided the aerobic organisms are exposed to gas within the sealed package, but isolated from the food therein, any aerobic organisms can be employed whether or not appropriate for human consumption or whether or not flavor changes might result if the food were inoculated directly.

In the preferred practice of the invention, the organism inoculation is prepared by adding one pound of brewers yeast to thirty pounds of water of acceptable standards of purity. Thorough mixing suspends the yeast in the water. The cheese is prepared in the usual way by cleaning and removing the rind. It may be in blocks or slices of any size or shape.

The prepared cheese is dipped briefly into, or lightly sprayed with, the suspension of yeast in water and upon removal, the excess liquid is drained off. Thereupon the cheese is placed in a pouch or other wrapper and sealed therein. A sheet paper or film wrapper may be used and wrapped around the product and sealed. The wrapper should be impervious and must be at least substantially impervious to air when completed and sealed about the food.

In the case of coffee to be sold in sealed tins, it is preferred that the coffee be packaged dry and accordingly, a small amount of brewers yeast with suitable media food for growth separately wrapped in an air-pervious wrapper is simply placed in the tin with the coffee at the time the coffee is sealed therein. Meat can be dipped in an aqueous solution of brewers yeast, the same as cheese, and subsequently wrapped in an impervious wrapper or pouch and sealed. An alternative procedure is to inoculate an absorbent material such as cotton or filter cloth or filter paper with the selected aerobic organisms and a food medium suitable for the growth thereof, the carrier being thereupon placed in the container or wrapper with the food.

After the packages are completed and either before or after they are placed in the shipping container for shipment, they are desirably held at a temperature favorable to growth of the inoculating organism until the oxygen is consumed and replaced by carbon dioxide. By way of example, but not by way of limitation, in the case of brewers yeast inoculation of cheese, the product may be kept at about 65° F. for about twenty-four hours. If the product is one which is ordinarily refrigerated, as is the case when cheese and meat are the products involved, the product is then placed in ordinary refrigeration, usually at temperatures between 33° F. and 40° F.

The procedure is one which can be adapted to any product line, and there is nothing critical about it with the exception of incorporating the aerobic organism with the food within a sealed package, preferably maintaining the packed food for a reasonable time thereafter at a temperature which will permit the organism to consume the oxygen and produce carbon dioxide to replace the oxygen.

I claim:

1. A method of protecting a food product from oxidation and from mold, which method includes the steps of sealing the food product in a substantially impervious enclosure with an aerobic organism capable of consuming the oxygen in such enclosure.

2. A method of protecting a food against mold which requires oxygen for its growth, said method comprising inoculating the food with edible aerobic organism and then packaging the food and organism in a substantially impervious enclosure and holding it temporarily at a temperature favorable for the development of said organism and thereafter refrigerating the food.

3. A method of packaging cheese, which method comprises preparing the cheese for packaging, preparing an inoculant which includes a mixture of an aerobic species of edible organism in a potable liquid in which said organism is viable, inoculating the cheese with the liquid mixture contaning the organism and thereafter enclosing the inoculated cheese in a sealed and substantially impervious wrap.

4. A method of oxygen-free packaging of food, which method comprises enclosing the food in a substantially impervious jacket with an organism requiring oxygen for its development and giving off carbon dioxide in the course of such development.

5. The method recited in claim 4 in which the food is directly inoculated with such organism, the food comprising a medium favorable for the growth of such organism, said method including the further step of maintaining the food at temperatures favorable for organism development until the oxygen within said jacket has been consumed and replaced by carbon dioxide.

6. The method recited in claim 4 in which a medium separate from the food and appropriate for the development of said organism is inoculated with the organism and included in the jacket.

7. A method of oxygen-free packaging of cheese, which method comprises preparing the cheese for packaging, preparing an aqueous mixture of brewers yeast, inoculating the prepared cheese with such mixture, draining off the surplus of the aqueous mixture, placing the inoculated cheese within an enveloping wrap of impervious film material and sealing the cheese within such wrap, maintaining the wrapped inoculated cheese at temperatures favorable to bacterial incubation for a period sufficient to bring about substantial bacterial consumption of the oxygen and replacement with carbon dioxide within the wrap, and thereafter refrigerating the wrapped and substantially oxygen-free cheese pending distribution.

8. A method of packaging a food product for protection against oxidation and mold, which method comprises preparation of the product for packaging, preparation of a bacterial inoculation by mixing brewers yeast with water, inoculating the prepared food product by dipping it briefly into the aqueous mixture of brewers yeast and thereupon withdrawing the food product from such mixture and draining off the surplus of such mixture, packaging the inoculated food product in a substantially impervious material and sealing such material about the product, exposing the packaged and inoculated product to temperatures favorable to bacterial development for a period sufficient to enable the bacteria to substantially consume the oxygen sealed within such material about the product, and thereafter maintaining the product at temperatures suitable for its distribution.

9. A method of protecting from oxidation a product destined for human consumption, which method includes the steps of sealing such product in material substantially impervious to air and including aerobic bacteria with such product within said sealed material, and maintaining the product and bacteria at a temperature favorable for bacterial development for a period at least sufficient to effect substantial consumption of the oxygen sealed within said material.

10. The method recited in claim 9 in which the material comprises a metal can having an hermetic seal and the bacteria sealed within said can is isolated from the contents of the can destined for human consumption.

11. A substantially oxygen-free package comprising a product destined for human consumption sealed in substantially impervious material, said package containing not only said product, but an aerobic organism by which the oxygen content of said package after sealing will be consumed and replaced with carbon dioxide.

12. A package according to claim 11 in which the substantially impervious material comprises a flexible wrapping film and the product intended for human consumption comprises a food having surface inoculation with said organism, the organism comprising a species consumable without health impairment.

13. A package according to claim 12 in which the product comprises cheese and the organism is a yeast.

14. A package according to claim 11 in which the impervious material comprises a metallic can and cover.

15. The package defined in claim 11 in which the package not only contains the said product and organism, but further contains a growth medium inoculated with said organism and separate from said product.

16. The package according to claim 15 in which the package further contains a carrier for said growth medium and the inoculation with said organism.

References Cited in the file of this patent

UNITED STATES PATENTS

| | | |
|---|---|---|
| 2,825,651 | Loo et al. | Mar. 4, 1958 |
| 2,882,169 | Kielsmeier et al. | Apr. 14, 1959 |